United States Patent
Graf

(10) Patent No.: US 11,037,446 B2
(45) Date of Patent: Jun. 15, 2021

(54) METHOD AND SYSTEM OF FACILITATING MANAGEMENT OF PARKING SPACES FOR VEHICLES

(71) Applicant: Teresa Lyn Graf, Robins, IA (US)

(72) Inventor: Teresa Lyn Graf, Robins, IA (US)

(*) Notice: Subject to any disclaimer, the term of this patent is extended or adjusted under 35 U.S.C. 154(b) by 0 days.

(21) Appl. No.: 16/714,224

(22) Filed: Dec. 13, 2019

(65) Prior Publication Data

US 2020/0118437 A1    Apr. 16, 2020

Related U.S. Application Data

(63) Continuation-in-part of application No. PCT/IB2018/054343, filed on Jun. 13, 2018.

(60) Provisional application No. 62/518,704, filed on Jun. 13, 2017.

(51) Int. Cl.
| | |
|---|---|
| G08B 21/00 | (2006.01) |
| G08G 1/14 | (2006.01) |
| G01C 21/36 | (2006.01) |
| G06Q 10/02 | (2012.01) |
| G07B 15/02 | (2011.01) |

(52) U.S. Cl.
CPC ......... *G08G 1/141* (2013.01); *G01C 21/3685* (2013.01); *G06Q 10/02* (2013.01); *G07B 15/02* (2013.01); *G08G 1/149* (2013.01)

(58) Field of Classification Search
CPC .... G08G 1/141; G08G 1/149; G01C 21/3685; G06Q 10/02; G07B 15/02
USPC ...................................... 340/932.2
See application file for complete search history.

(56) References Cited

U.S. PATENT DOCUMENTS

| | | | |
|---|---|---|---|
| 9,418,553 B2 | 8/2016 | Nakhjavani | |
| 10,482,765 B2 | 11/2019 | Smart | |
| 2011/0022427 A1 | 1/2011 | Dayan | |
| 2011/0140922 A1* | 6/2011 | Levy | G08G 1/14 340/932.2 |
| 2013/0143536 A1 | 6/2013 | Ratti | |
| 2014/0249742 A1* | 9/2014 | Krivacic | G06Q 10/02 701/400 |
| 2015/0066545 A1* | 3/2015 | Kotecha | G06Q 10/02 705/5 |

(Continued)

FOREIGN PATENT DOCUMENTS

| | | |
|---|---|---|
| CN | 101271633 A | 9/2008 |
| GB | 2489195 A | 9/2012 |
| WO | WO2013154967 A1 | 10/2013 |

*Primary Examiner* — Mark S Rushing

(57) ABSTRACT

Disclosed is a method of facilitating management of parking spaces for vehicles. The method may include transmitting, using the communication device, a plurality of parking status indicators associated with a plurality of parking spaces to a user device associated with a vehicle. Further, the plurality of parking spaces may be associated with a facility. Further, the method may include receiving, using the communication device, a parking reservation request from the user device. Further, the method may include transmitting, using the communication device, a reservation confirmation to the user device. Further, the method may include generating, using a processing device, an updated plurality of parking status indicators based on transmitting the reservation confirmation. Further, the method may include storing, using a storage device, the updated plurality of parking status indicators.

18 Claims, 13 Drawing Sheets

(56) References Cited

U.S. PATENT DOCUMENTS

| | | | |
|---|---|---|---|
| 2015/0138001 A1* | 5/2015 | Davies | G08G 1/017 |
| | | | 340/932.2 |
| 2016/0240086 A1 | 8/2016 | Nicodemus et al. | |
| 2016/0371607 A1* | 12/2016 | Rosen | G06Q 10/02 |
| 2017/0098375 A1* | 4/2017 | Smart | G01C 21/3685 |
| 2017/0267233 A1 | 9/2017 | Minster et al. | |

* cited by examiner

METHOD AND SYSTEM OF FACILITATING MANAGEMENT OF PARKING SPACES FOR VEHICLES

The current application is a U.S. non-provisional application and claims a priority to a Patent Cooperation Treaty (PCT) application serial number PCT/IB2018/054343 filed on Jun. 13, 2018. The PCT application PCT/IB2018/054343 claims a priority to a U.S. provisional application Ser. No. 62/518,704 filed on Jun. 13, 2017.

FIELD OF THE INVENTION

The present disclosure relates to data processing. More specifically, the present disclosure relates to a method and system of facilitating management of parking spaces for vehicles.

BACKGROUND OF THE INVENTION

Often people find it challenging to find available parking spaces for their vehicles. This leads to wastage of time and effort. Moreover, people may experience a lot of anxiety while they look around to find the available parking spaces.

Further, many times a small parked vehicle may take up more space than required. For example, a little boat may take up a big parking spot designed for a bigger boat.

Further, the conventional systems do not allow people to communicate with facilities providing parking spaces to obtain information about available parking spaces before people visit the respective facilities.

Therefore, there is a need for improved methods and systems to facilitate management of parking spaces for vehicles that may overcome one or more of the abovementioned problems and/or limitations.

SUMMARY OF THE INVENTION

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

In some embodiments, a method of facilitating management of parking spaces for vehicles is disclosed. The method may include transmitting, using the communication device, a plurality of parking status indicators associated with a plurality of parking spaces to a user device associated with a vehicle. Further, the plurality of parking spaces may be associated with a facility. Further, the method may include receiving, using the communication device, a parking reservation request from the user device. Further, the method may include transmitting, using the communication device, a reservation confirmation to the user device. Further, the method may include generating, using a processing device, an updated plurality of parking status indicators based on transmitting the reservation confirmation. Further, the method may include storing, using a storage device, the updated plurality of parking status indicators.

According to some aspects, a system for facilitating management of parking spaces for vehicles is also disclosed. The system may include a communication device configured for: transmitting a plurality of parking status indicators associated with a plurality of parking spaces to a user device associated with a vehicle. Further, the plurality of parking spaces may be associated with a facility. Further, the communication device may be configured for receiving a parking reservation request from the user device. Further, the communication device may be configured for transmitting a reservation confirmation to the user device. Further, the system may include a processing device configured for generating an updated plurality of parking status indicators based on transmitting the reservation confirmation. Further, the system may include a storage device configured for storing the updated plurality of parking status indicators.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
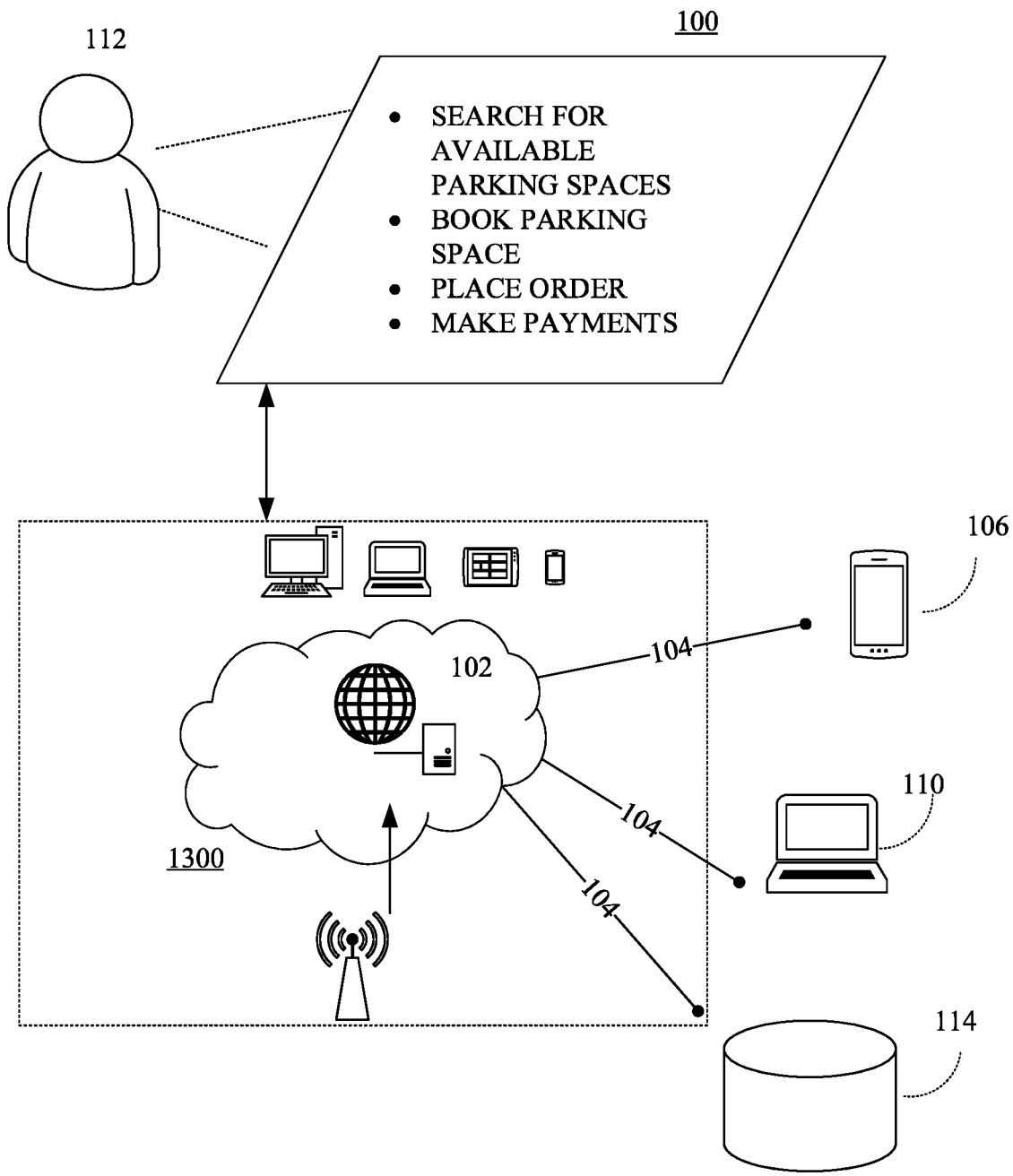
FIG. 1 is an illustration of a platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of facilitating management of parking spaces for vehicles, in accordance with some embodiments, embodiments of the present disclosure are not limited to use only in this context.

Overview

According to some embodiments, a mobile application for managing parking spaces is disclosed. The mobile application may operate as a parking system for vehicle owners to communicate with facilities providing parking. For example, vehicles may include land vehicles (like cars) or watercraft (like boats).

Further, the mobile application may allow users to view restaurants that have available parking spaces. Further, the users may book a parking space using the mobile application. The booked parking space is marked as reserved for other users looking for parking space nearby. Further, the mobile application may also allow users to order limited food and drinks from their vehicle.

Referring now to figures, FIG. 1 is an illustration of a platform consistent with various embodiments of the present disclosure. By way of non-limiting example, the online platform 100 facilitating management of parking spaces for vehicles may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114 (such as geospatial databases) over a communication network 104, such as, but not limited to, the Internet. Further, users of the platform may include relevant parties such as one or more of individual users, employees at various facilities, parking space providers, administrators, etc. Accordingly, electronic devices operated by the one or more relevant parties may be in communication with the platform 100. For example, the mobile device 106 may be operated by a user, who may request for information about available parking spaces nearby. The user may use a mobile application installed on the mobile device 106 to request for information about available parking spaces nearby. FIGS. 6-12 show various user interfaces of a mobile application installed on a user device of the user in accordance with exemplary embodiments.

A user 112, such as the one or more relevant parties, may access platform 100 through a web-based software application or browser. The web-based software application may be embodied as, for example, but not be limited to, a website, a web application, a desktop application, and a mobile application compatible with a computing device 1300.

Figure 2:
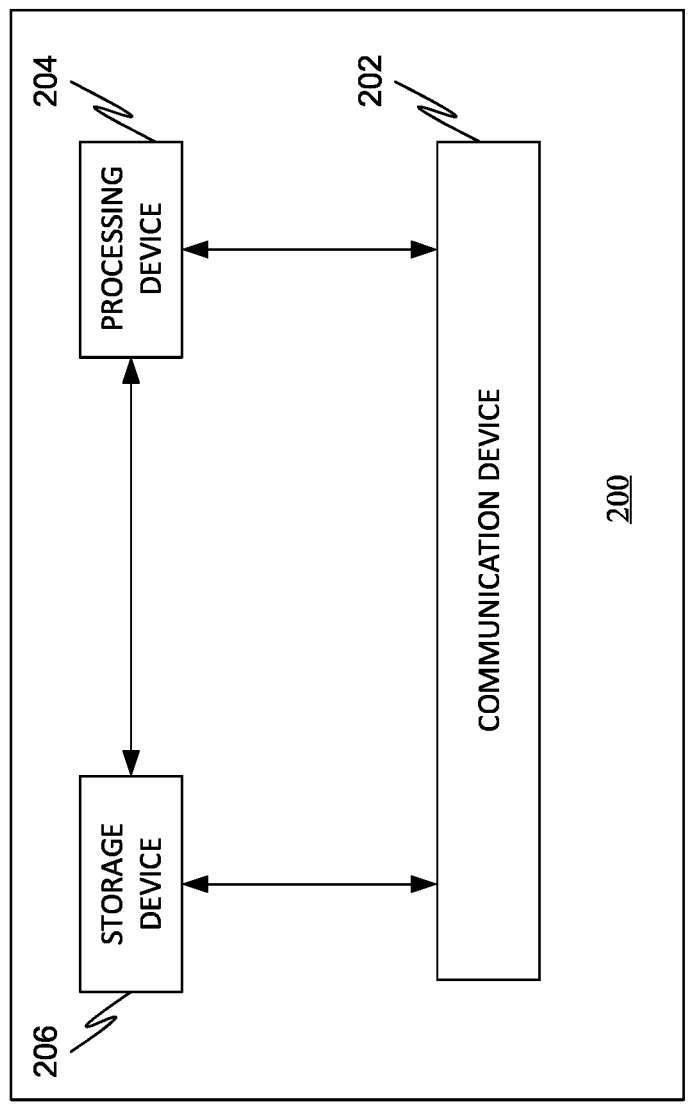
FIG. 2 is a block diagram of a system for facilitating management of parking spaces for vehicles in accordance with some embodiments.
Figure 6:
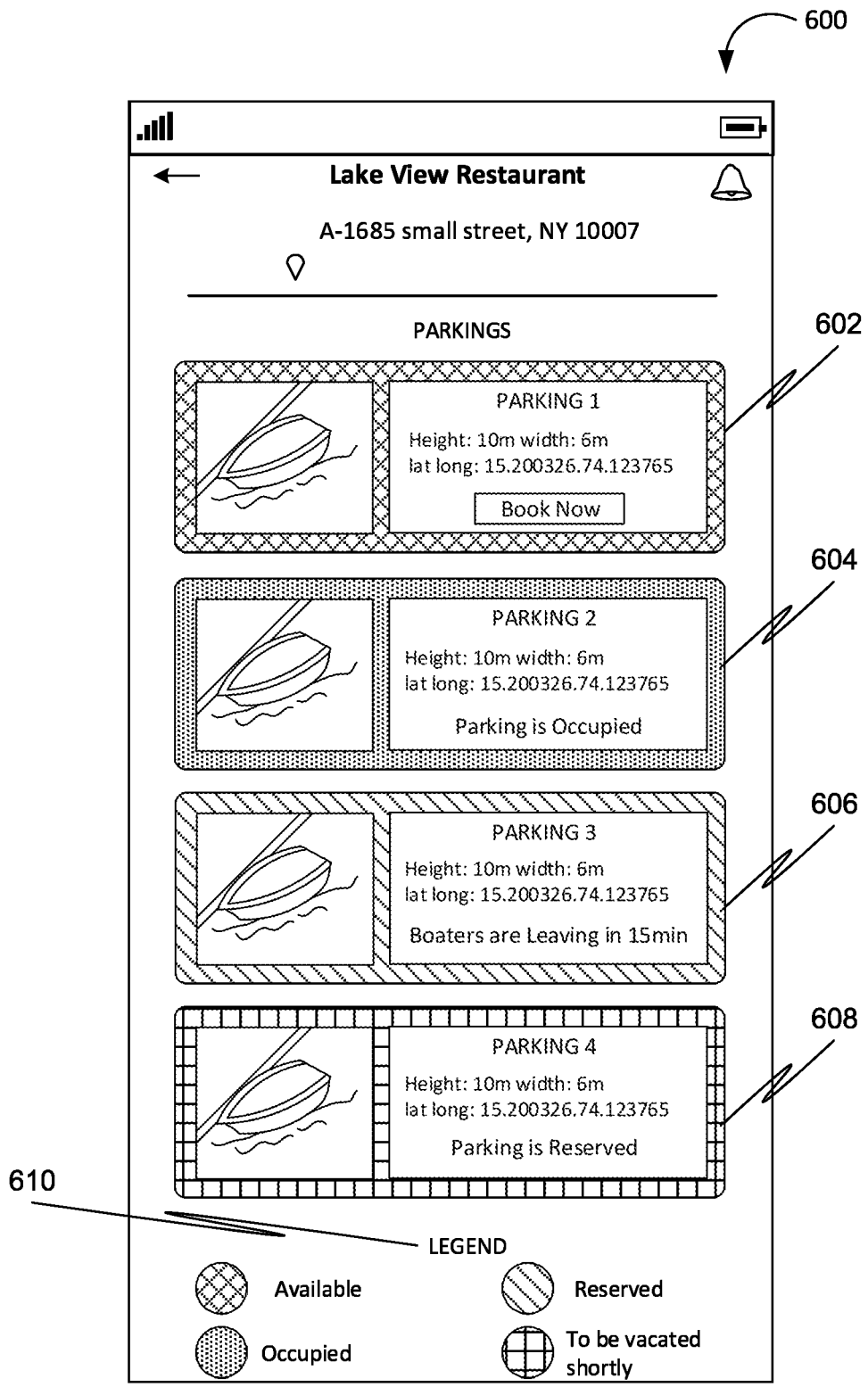
FIG. 6 illustrates a user interface of a mobile application installed on a user device in accordance with an exemplary embodiment.

According to some embodiments, the online platform 100 may communicate with a system 200 (shown in FIG. 2) to facilitate management of parking spaces for vehicles. FIG. 2 is a block diagram of the system 200 for facilitating management of parking spaces for vehicles in accordance with some embodiments. The system 200 may include a communication device 202 configured for transmitting a plurality of parking status indicators associated with a plurality of parking spaces to a user device (such as the mobile device 106) associated with a vehicle. A parking status indicator in the plurality of parking status indicators may indicate the status of a corresponding parking space. For example, the status of a parking space may include one or more of an "available" status, an "occupied" status, a "reserved" status and a "to be vacated shortly" status. In some embodiments, the plurality of parking status indicators may include a plurality of colors. For example, a green color may indicate an available parking space, a red color may indicate an occupied parking space, a purple color may indicate that the parking space will be vacated shortly, and a blue color may indicate a reserved parking space. FIG. 6 illustrates a user interface 600 of a mobile application installed on the user device in accordance with an exemplary embodiment. The user interface 600 shows status of four parking spaces 602-608 near a restaurant named "Lake View Restaurant." The status of the four parking spaces 602-608 is indicated using the plurality of parking status indicators. The parking status indicators include shaded regions defined in a legend 610. For example, the parking status indicator for the parking space 602 indicates that the parking space 602 is available. The parking status indicator for the parking space 604 indicates that the parking space 604 is occupied. The parking status indicator for the parking space 606 indicates that the parking space 606 is reserved. The parking status indicator for the parking space 608 indicates that the parking space 608 will be vacated shortly.

Further, the plurality of parking spaces may be associated with a facility. For example, the facility may include, but is not limited to, restaurants, hotels, parks, service stations, shopping centers, bakeries, movie theaters, and public libraries.

Figure 7:
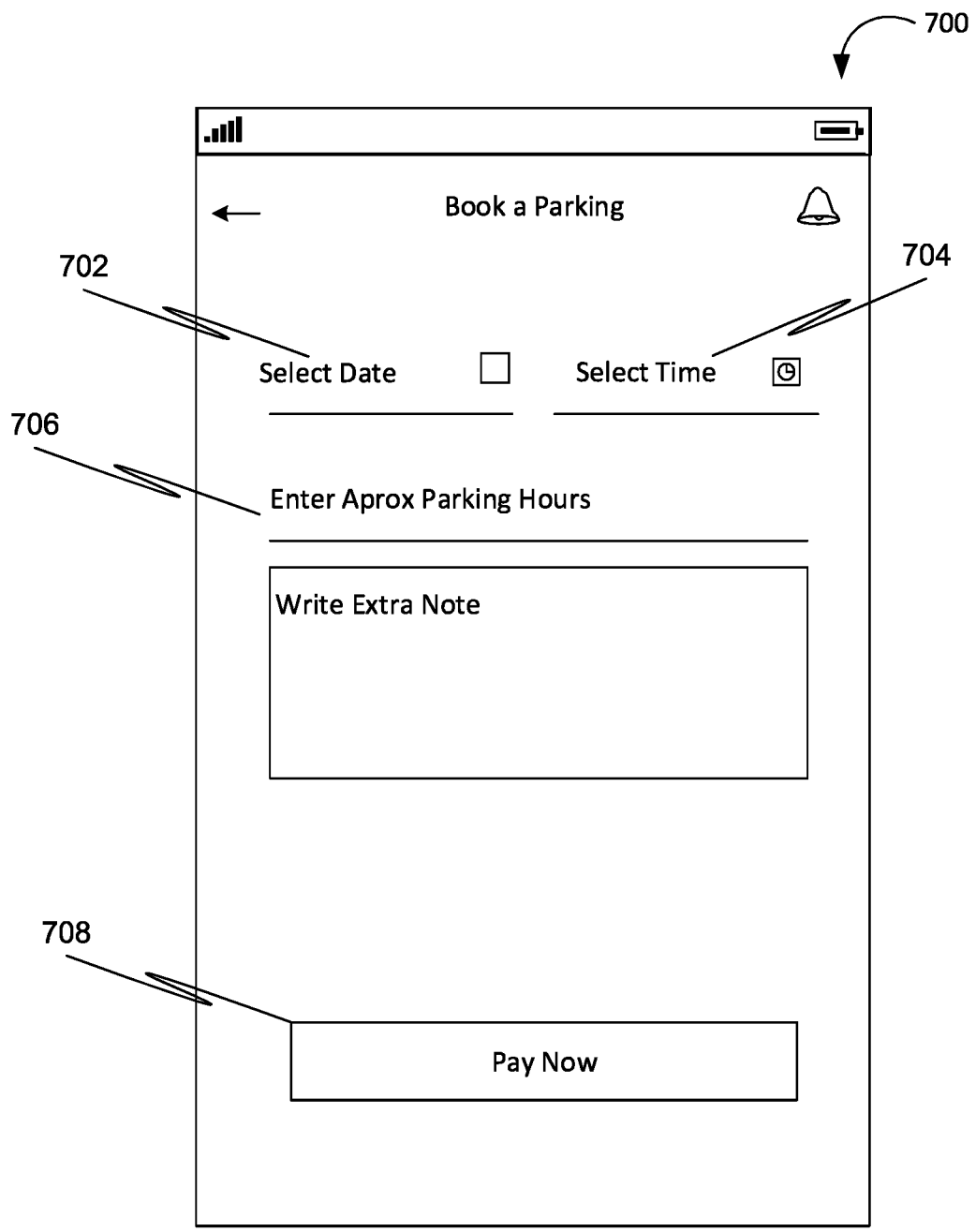
FIG. 7 illustrates a user interface of the mobile application installed on the user device in accordance with an exemplary embodiment.

Further, the communication device 202 may be configured for receiving a parking reservation request from the user device. FIG. 7 illustrates a user interface 700 of the mobile application installed on the user device in accordance with an exemplary embodiment. The user interface 700 includes a form that the user may use to send the parking reservation request. For example, when the user selects an available parking space from the user interface 600, the mobile application may display the user interface 700. The form on the user interface 700 may include one or more form fields including a "select date" field 702, a "select time" field 704, and an "enter approximate parking hours" field 706. Further, the user interface 700 may include a "pay" button 708. The user may fill the form fields 702-706 and then press the "pay" button 708 to make the payment and send the parking reservation request.

Further, the communication device 202 may be configured for transmitting a reservation confirmation to the user device. For example, the mobile application installed on the user device may display the received reservation confirmation.

Further, the system 200 may include a processing device 204 configured for generating an updated plurality of parking status indicators based on transmitting the reservation confirmation. Further, the system 200 may include a storage device 206 configured for storing the updated plurality of parking status indicators.

In further embodiments, the communication device 202 may be further configured for receiving a current location of the user device. Further, the generating of the plurality of parking status indicators may be further based on the current location.

Figure 8:
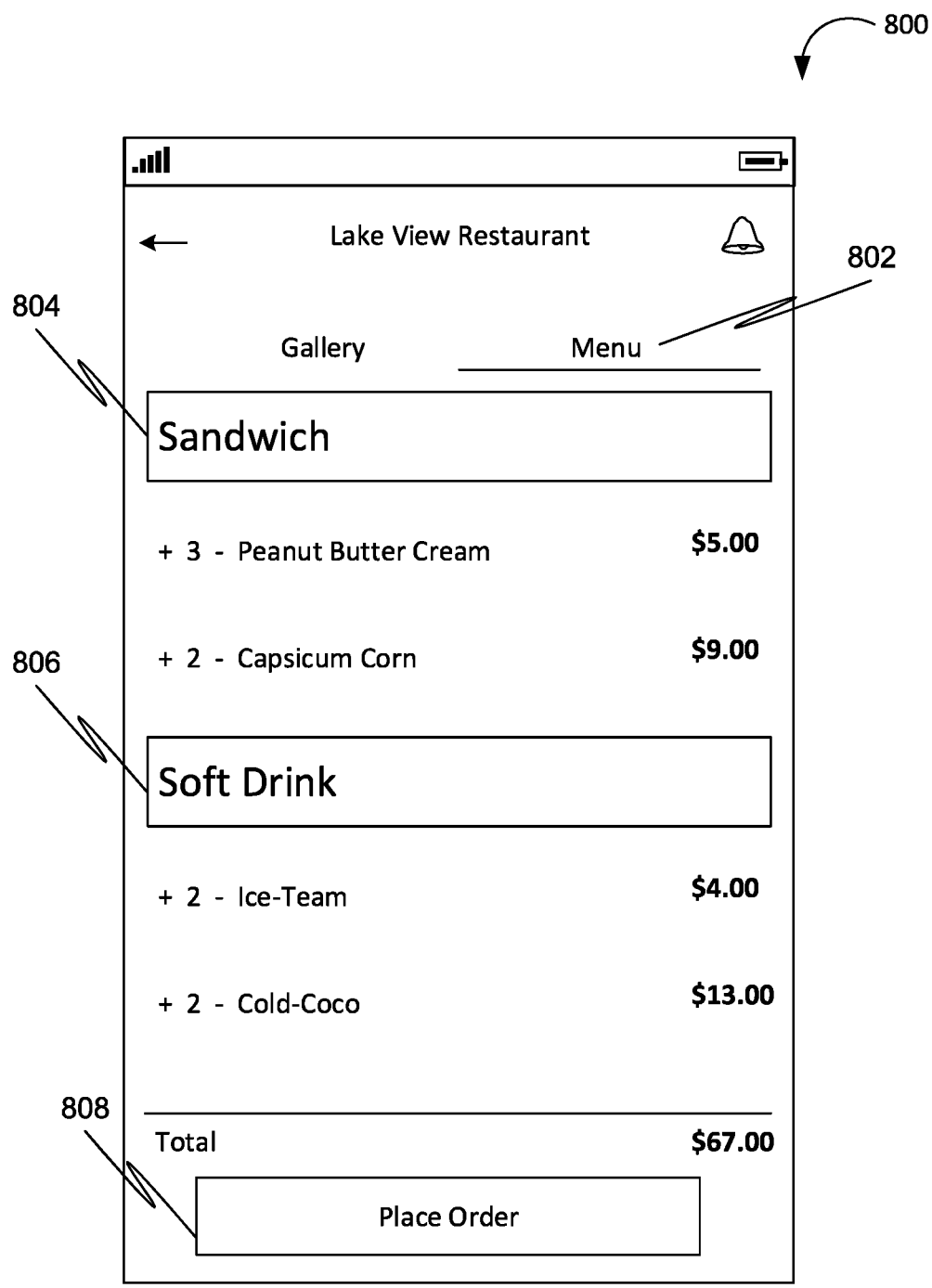
FIG. 8 illustrates a user interface of the mobile application installed on the user device in accordance with an exemplary embodiment.

In some embodiments, the communication device 202 may be further configured for transmitting service information to the user device. Further, the service information may be associated with at least one service provided by the facility. For example, the service information may include a menu comprising food items served by a restaurant, a hotel or a bakery. Further, the mobile application may include a chatbot. Further, the chatbot may be configured for receiving one or more queries associated with the at least one service through the user device. Further, the one or more queries may include verbal queries, textual queries, etc. Further, the user device may be configured for generating the one or more queries. Further, the chatbot may be configured for analyzing the one or more queries. Further, the analyzing comprises natural language processing, machine learning, artificial intelligence analysis, etc. Further, the chatbot may be configured for retrieving the service information from a database (such as database 114) based on the analyzing. Further, the chatbot may be configured for generating at least one response corresponding to the one or more queries. Further, the user device may be configured for presenting the at least one response. Further, the one or more queries may be associated with the food items on the menu. Further, the one or more queries may be associated with at least one additional service provided by the facility. Further, the at least one additional service may include a provision for high chairs, a provision of children's menu, etc. FIG. 8 illustrates a user interface 800 of the mobile application installed on the user device in accordance with an exemplary embodiment. The user interface 800 includes a menu 802 comprising one or more food items 804-806. The user may select one or more food items in the menu 802 and place an order using a "place order" button 808. Therefore, the user may place an order at a restaurant before arriving at the restaurant using the mobile application.

Figure 9:
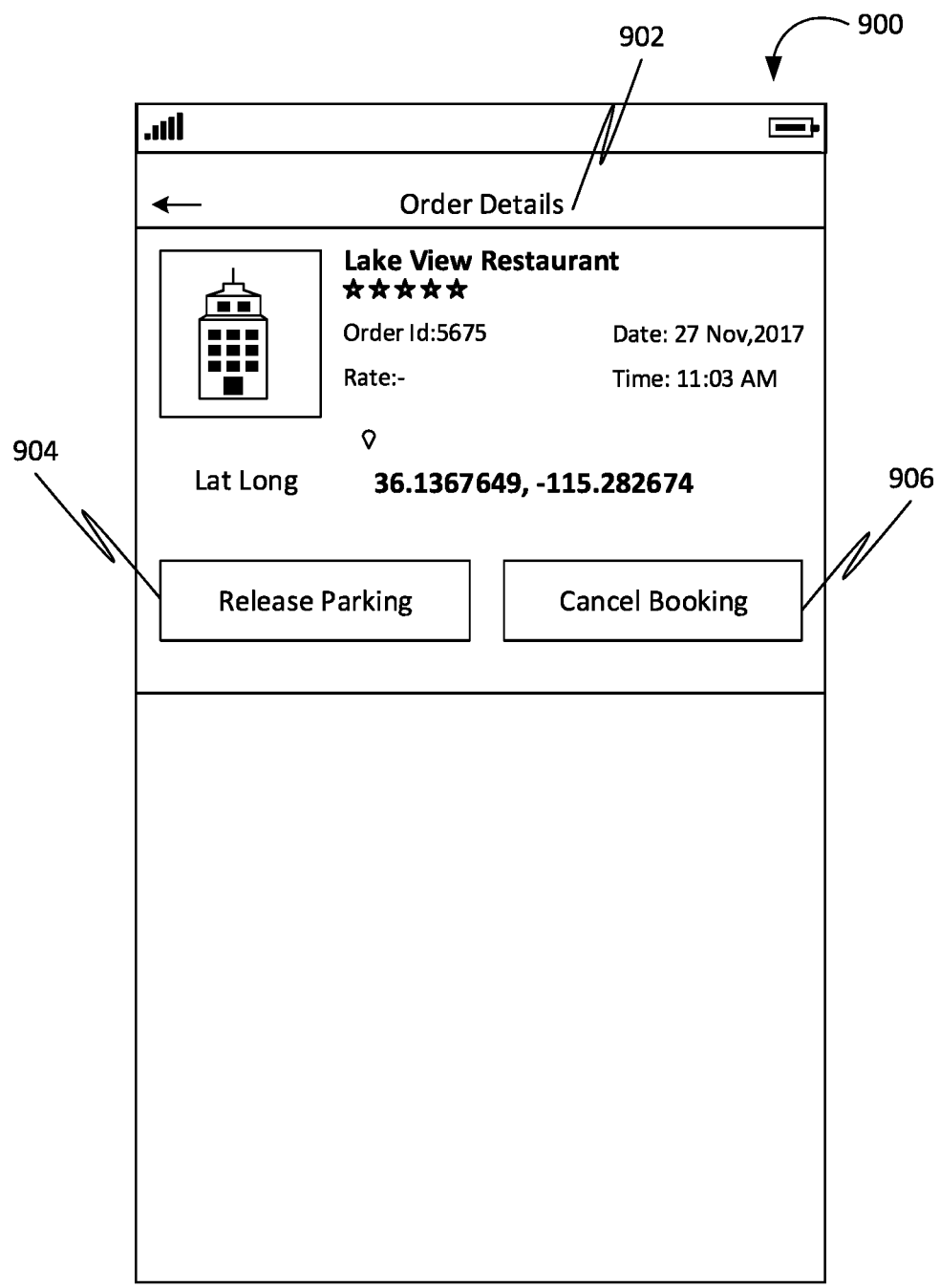
FIG. 9 illustrates a user interface of the mobile application installed on the user device in accordance with an exemplary embodiment.

Further, the communication device 202 may be configured for receiving a service order from the user device. Further, the storage device 206 may be further configured for storing the service order. FIG. 9 illustrates a user interface 900 of the mobile application installed on the user device in accordance with an exemplary embodiment. The user interface 900 includes order details 902 for the order placed by the user. For example, the order details 902 may include one or more of an order ID, a date and time order was place, and a price of the order. Further, the user interface 900 may include a "Release Parking" button 904 that the user may use when the user is ready to vacate an occupied parking space. Further, the user interface 900 may include a "Cancel Booking" button 906 that the user may use to cancel a booking at the facility.

Figure 10:
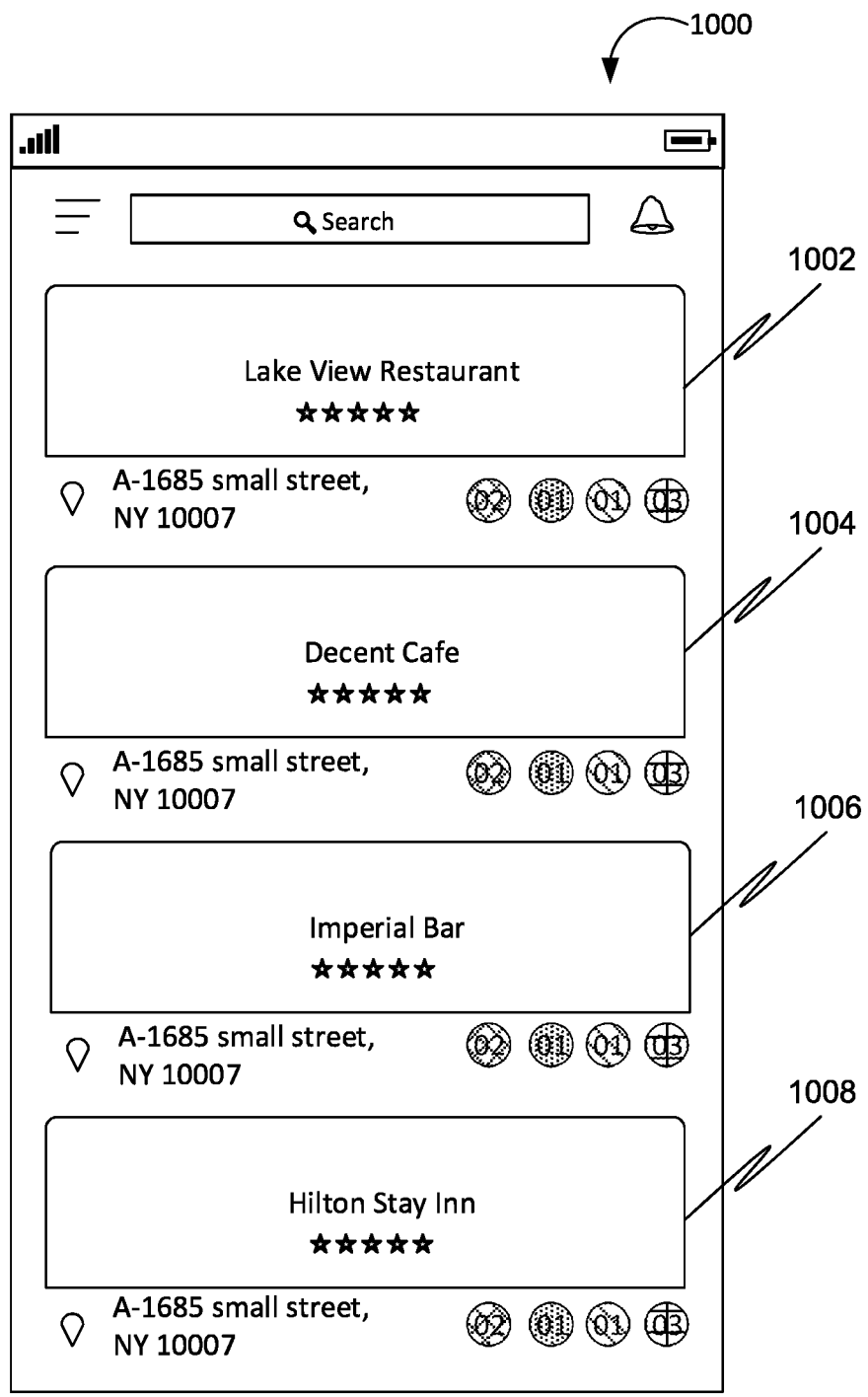
FIG. 10 illustrates a user interface of the mobile application installed on the user device in accordance with an exemplary embodiment.

In some embodiments, the communication device 202 may be further configured for receiving a service request from the user device. For example, the service request may include a request for a list of restaurants nearby, a request for a menu of a facility nearby etc. Further, the communication device 202 may be configured for transmitting the service information to the user device. Thereafter, the service information may be displayed on the user device. Further, the facility may be associated with a geofence. Further, the mobile application may be configured for receiving the service request. Further, the service request may include a request for seafood, a request for continental food, a request for Chinese food, etc. Further, the mobile application may be configured for receiving device location data associated with the user device. Further, the device location data may include a location of the user device in relation to the geofence of the facility. Further, the mobile application may be configured for analyzing the service request and the device location data. Further, the mobile application may be configured for generating a push notification based on the analyzing. Further, the user device may be configured for presenting the push notification. Further, the push notification may include the service information associated with the facility. FIG. 10 illustrates a user interface 1000 of the mobile application installed on the user device in accordance with an exemplary embodiment. The user interface 1000 includes a list of restaurants nearby. The list of restaurants may include "Lake View Restaurant" 1002, "Decent Café" 1004, "Imperial Bar" 1006 and "Hilton Stay Inn" 1008.

In further embodiments, the processing device 204 may be further configured for identifying a current location of the user device and identifying the facility based on the current location and the service request. Further, the storage device 206 may be further configured for retrieving service information associated with the facility.

In some embodiments, the communication device 202 may be further configured for receiving a vehicle type indicator from the user device. For example, the vehicle type indicator may indicate that the vehicle is a hatchback, a sedan, a multi-purpose vehicle (MPV), a sports utility vehicle (SUV), a crossover, a coupe, or a convertible. Further, the vehicle type indicator may indicate that the vehicle is a watercraft such as a fishing boat, a bass boat, a bow rider boat, a catamaran boat, a cuddy cabins boat, a center console boat, a houseboat, a trawler boat, a cabin cruiser boat, a motor yacht boat, a runabout boat, and a sedan bridge boat. Further, the vehicle type indicator may indicate a model and a make of the vehicle. Further, the processing device 204 may be configured for identifying at least one parking space of the plurality of parking spaces based on the vehicle type indicator. For example, the processing device 204 may determine the size of the vehicle from the received vehicle type indicator and identify the at least one parking space of the plurality of parking spaces based on the size of the vehicle.

In some embodiments, the communication device 202 may be further configured for receiving motion data from the user device. Further, the motion data may be generated using a motion sensor. Further, the generating of the plurality of parking status indicators may be further based on the motion data. Therefore, the system 200 may be able to automatically determine when a vehicle moves into a parking space. Accordingly, a parking status associated with the parking space may be automatically updated.

In further embodiments, the communication device 202 may be further configured for receiving a parking request from a user device associated with the vehicle. Further, the transmitting of the plurality of parking status indicators may be based on the parking request. In alternate embodiments, the communication device 202 may be configured for receiving a current location of the user device. Further, the processing device 204 may be configured for determining the current location being within a predetermined distance from a facility location associated with the facility. Further, the transmitting of the plurality of parking status indicators may be based on the determining.

Figure 11:
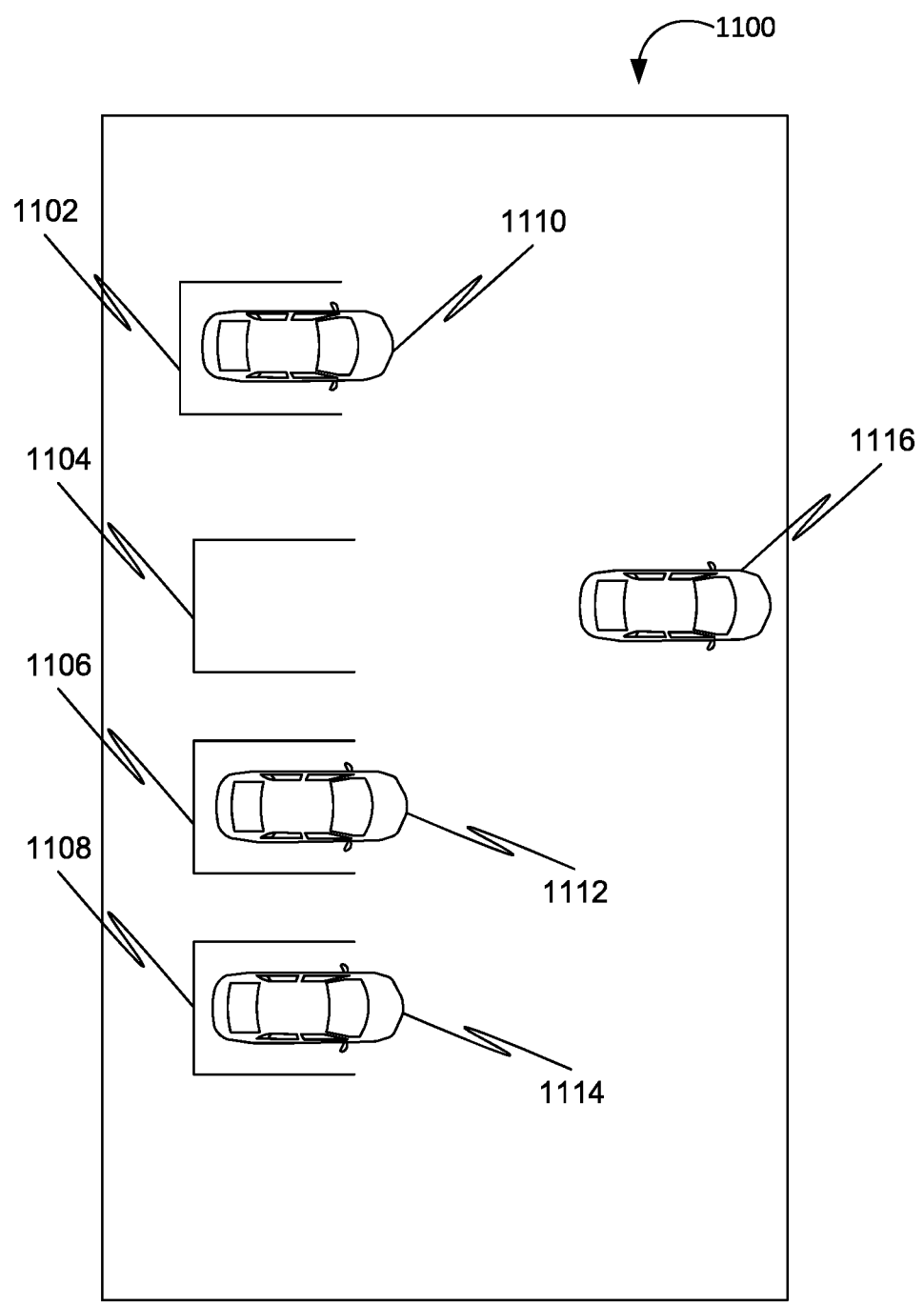
FIG. 11 illustrates a user interface of the mobile application installed on the user device in accordance with an exemplary embodiment.

In some embodiments, the plurality of parking status indicators may include a plan view corresponding to the facility. Further, the plan view may depict the plurality of parking spaces in association with the plurality of parking status indicators. FIG. 11 illustrates a user interface 1100 of the mobile application installed on the user device in accordance with an exemplary embodiment. The user interface 1100 includes a plan view displaying parking spaces 1102-1108 corresponding to a facility. Further, the plan view shows that the parking spaces 1102, 1106, and 1108 are occupied with cars 1110, 1112 and 1114 respectively. Further, the plan view shows that the parking space 1104 is vacant. The plan view may also show location of a user's car 1116 based on the location information received from the user device. The plan view shows exact location of the vacant parking space 1104 with respect to the location of a user's car 1116.

Figure 12:
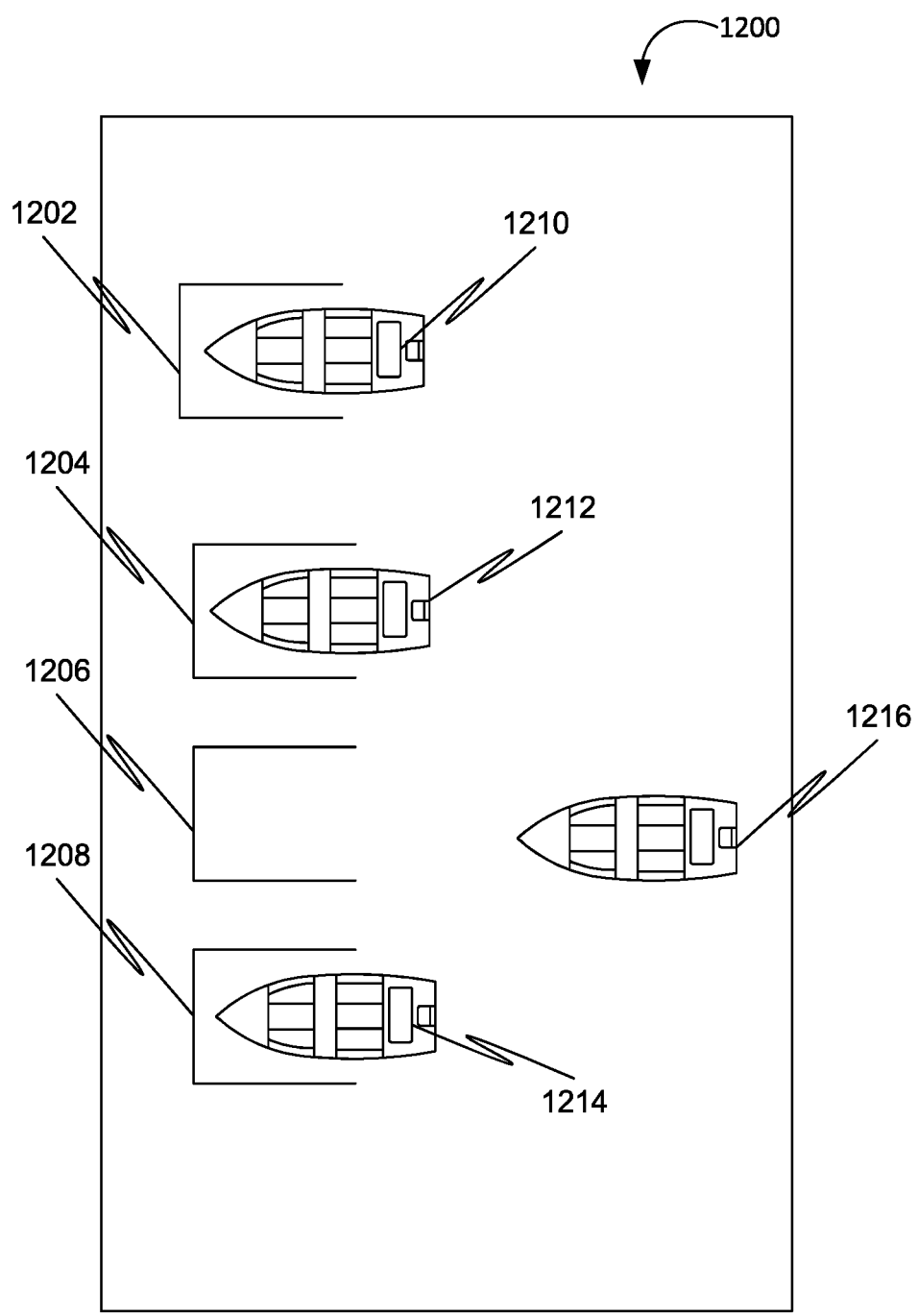
FIG. 12 illustrates a user interface of the mobile application installed on the user device in accordance with an exemplary embodiment.

FIG. 12 illustrates a user interface 1200 of the mobile application installed on the user device in accordance with an exemplary embodiment. The user interface 1200 includes a plan view displaying parking spaces 1202-1208 for watercrafts corresponding to a facility. Further, the plan view shows that the parking spaces 1202, 1204, and 1208 are occupied with watercrafts 1210, 1212 and 1214 respectively. Further, the plan view shows that the parking space 1206 is vacant. The plan view may also show location of a user's boat 1216 based on the location information received from the user device. The plan view shows exact location of the vacant parking space 1206 with respect to the location of a user's boat 1216.

Figure 3:
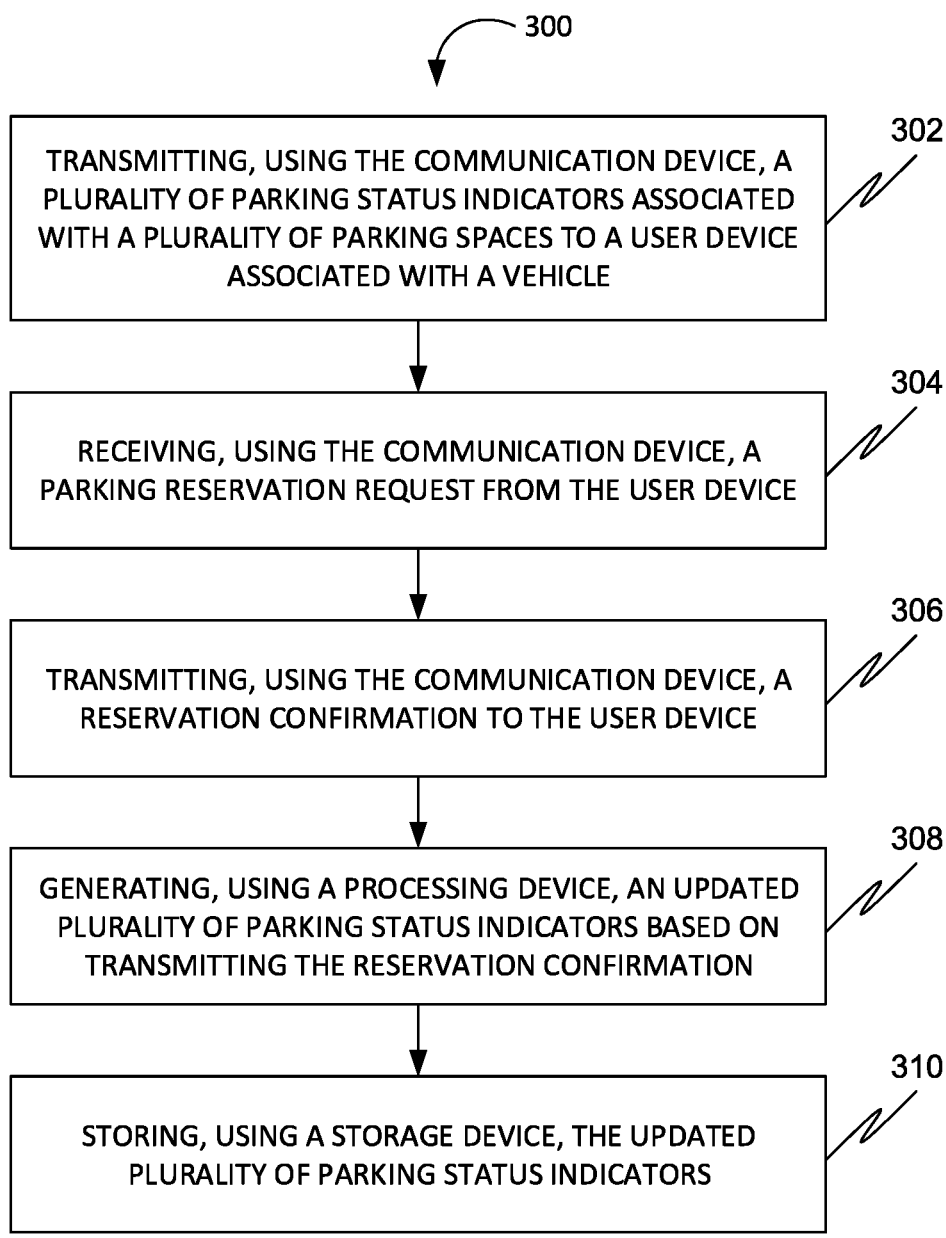
FIG. 3 is a flowchart of a method of facilitating management of parking spaces for vehicles in accordance with some embodiments.

FIG. 3 is a flowchart of a method 300 of facilitating management of parking spaces for vehicles in accordance with some embodiments. At 302, the method 300 may include transmitting, using a communication device (such as the communication device 202), a plurality of parking status indicators associated with a plurality of parking spaces to a user device associated with a vehicle. Further, the plurality of parking spaces may be associated with a facility. In some embodiments, the plurality of parking status indicators may include a plurality of colors.

At 304, the method 300 may include receiving, using the communication device, a parking reservation request from the user device. At 306, the method 300 may include transmitting, using the communication device, a reservation confirmation to the user device.

At 308, the method 300 may include generating, using a processing device (such as the processing device 204), an updated plurality of parking status indicators based on transmitting the reservation confirmation. At 310, the method 300 may include storing, using a storage device (such as the storage device 206), the updated plurality of parking status indicators.

In some embodiments, the method 300 may further include receiving, using the communication device, a vehicle type indicator from the user device and identifying, using the processing device, at least one parking space of the plurality of parking spaces based on the vehicle type indicator.

In some embodiments, the method 300 may further include receiving, using the communication device, a current location of the user device. Further, the generating of the plurality of parking status indicators may be based on the current location.

In some embodiments, the method 300 may further include receiving, using the communication device, motion data from the user device. Further, the motion data may be generated using a motion sensor of the user device. Further, the generating of the plurality of parking status indicators may be further based on the motion data.

In some embodiments, the method 300 may further include receiving, using the communication device, a current location of the user device and determining, using the processing device, the current location being within a predetermined distance from a facility location associated with the facility. Further, the transmitting of the plurality of parking status indicators may be based on the determining.

In some embodiments, the method 300 may further include receiving, using a communication device, a parking request from a user device associated with the vehicle. Further, the transmitting of the plurality of parking status indicators may be based on the parking request.

In some embodiments, the plurality of parking status indicators may include a plan view corresponding to the facility. Further, the plan view depicts the plurality of parking spaces in association with the plurality of parking status indicators.

Figure 4:
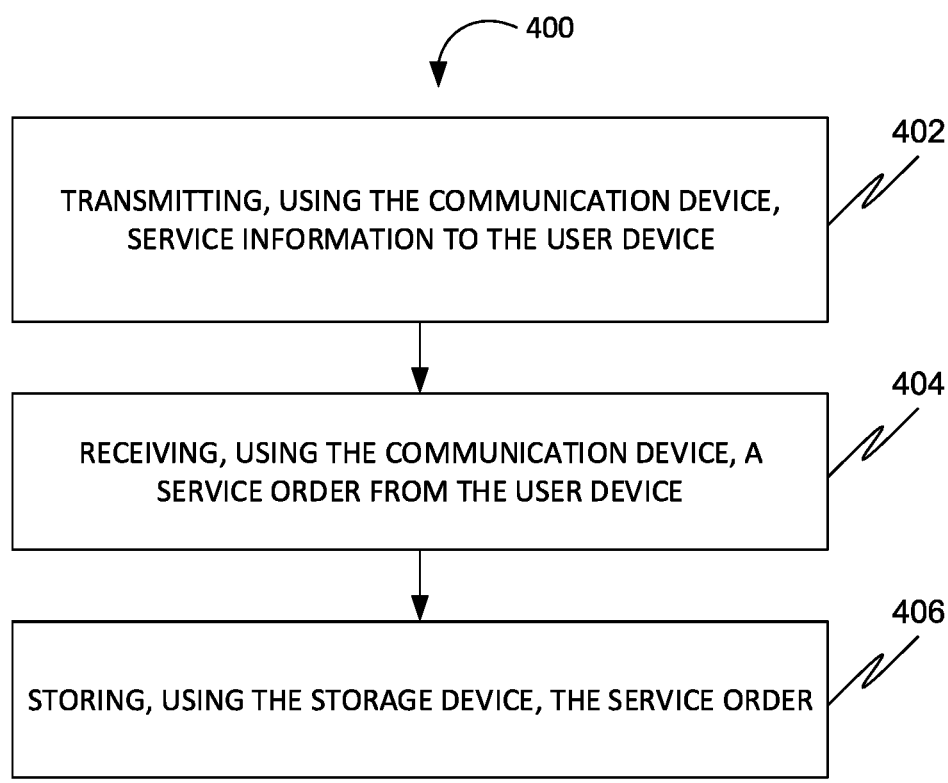
FIG. 4 is a flowchart of a method of placing a service order in accordance with some embodiments.

FIG. 4 is a flowchart of a method 400 of placing a service order in accordance with some embodiments. At 402, the method 400 may include transmitting, using the communication device, service information to the user device. Further, the service information may be associated with at least one service provided by the facility. At 404, the method 400 may include receiving, using the communication device, the service order from the user device. At 406, the method 400 may include storing, using the storage device, the service order.

Figure 5:
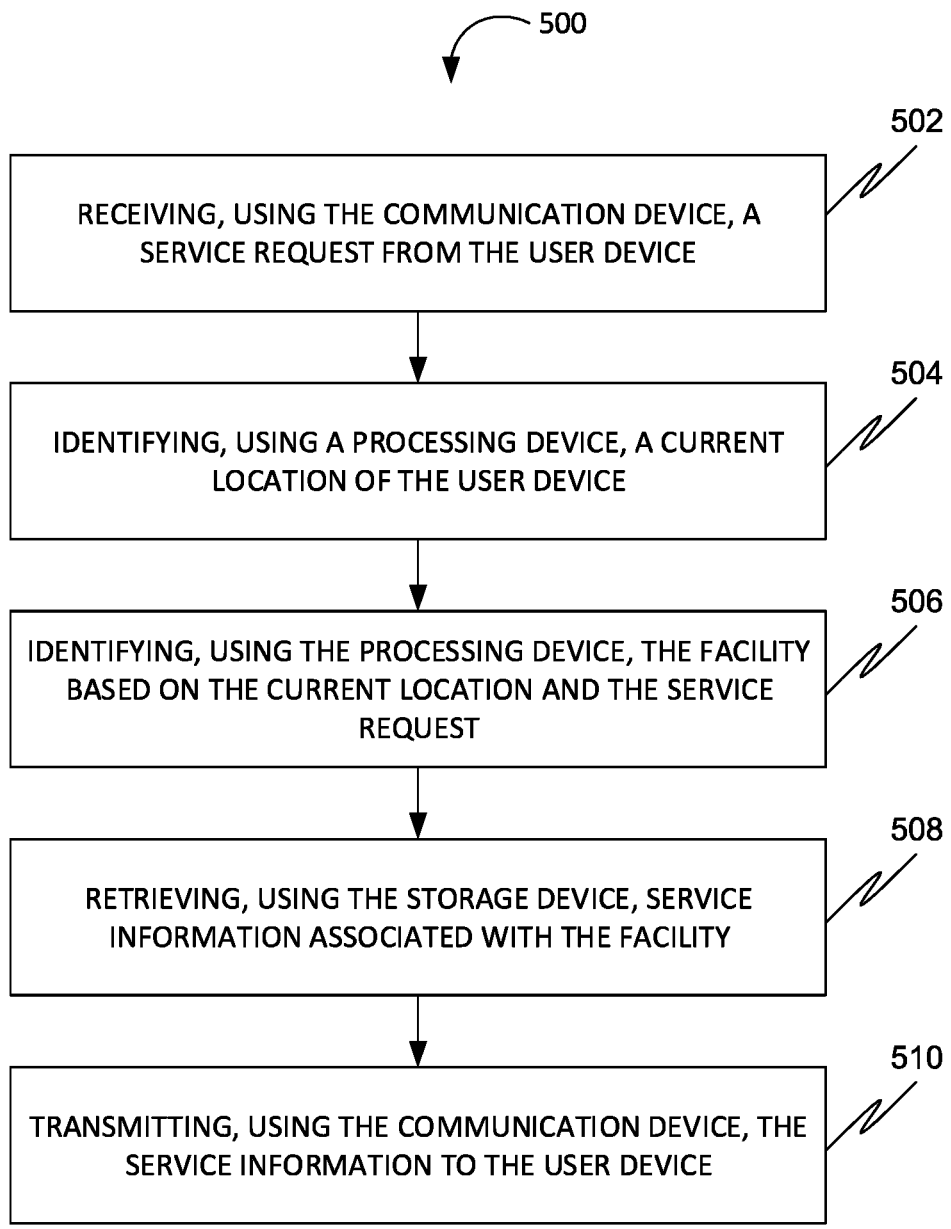
FIG. 5 is a flowchart of a method of obtaining service information in accordance with some embodiments.

FIG. 5 is a flowchart of a method 500 of obtaining service information in accordance with some embodiments. At 502, the method 500 may include receiving, using the communication device, a service request from the user device. At 504, the method 500 may include identifying, using a processing device, a current location of the user device. At 506, the method 500 may include identifying, using the processing device, the facility based on the current location and the service request. At 508, the method 500 may include retrieving, using the storage device, service information associated with the facility. At 510, the method 500 may include transmitting, using the communication device, the service information to the user device.

Figure 13:
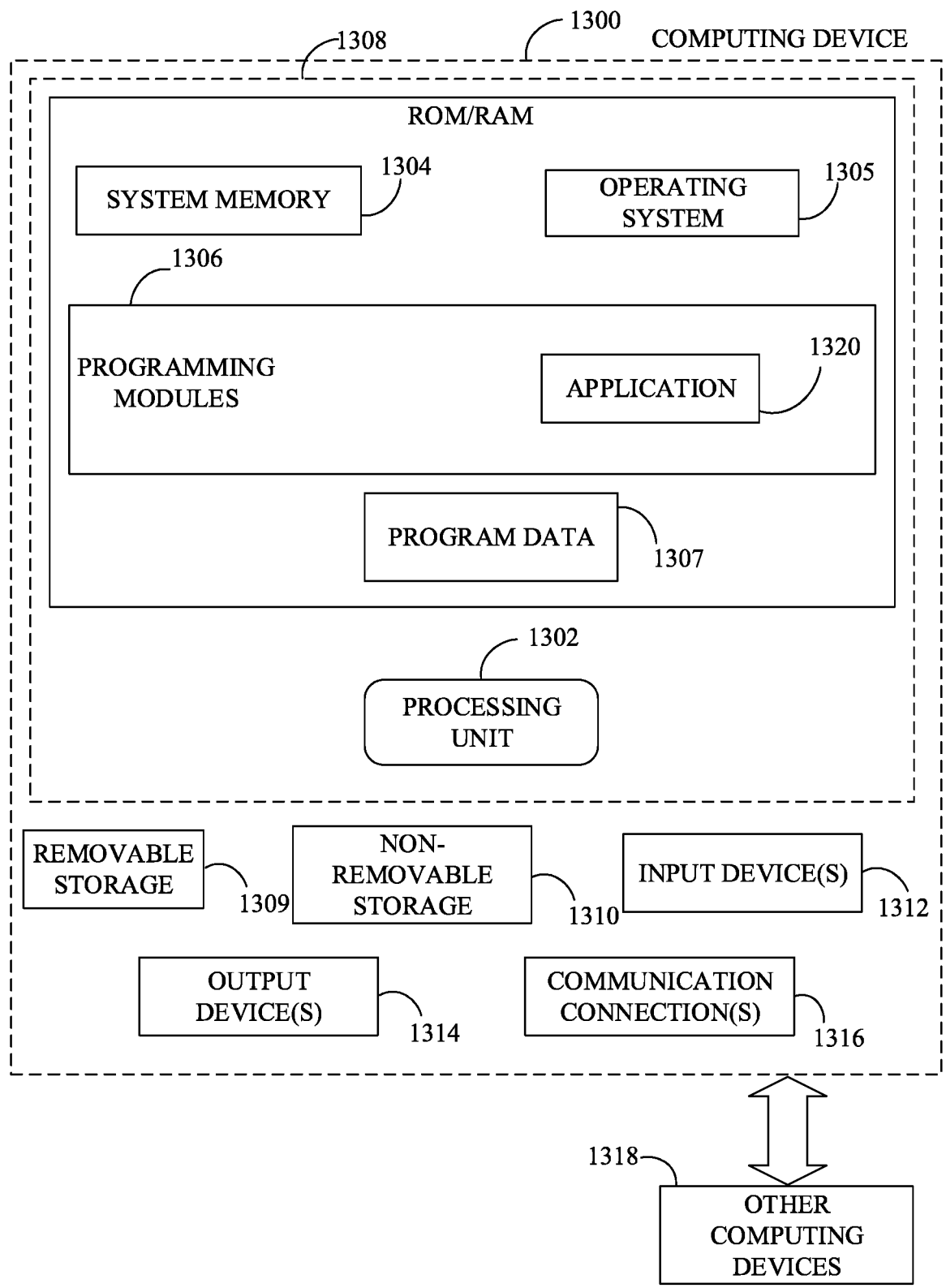
FIG. 13 is a block diagram of a computing device for implementing the methods disclosed herein, in accordance with some embodiments.

FIG. 13 is a block diagram of a computing device for implementing the methods disclosed herein, in accordance with some embodiments. Consistent with an embodiment of the disclosure, the aforementioned storage device and processing device may be implemented in a computing device, such as computing device 1300 of FIG. 13. Any suitable combination of hardware, software, or firmware may be used to implement the memory storage and processing unit. For example, the storage device and the processing device may be implemented with computing device 1300 or any of other computing devices 1318, in combination with computing device 1300. The aforementioned system, device, and processors are examples and other systems, devices, and processors may comprise the aforementioned storage device and processing device, consistent with embodiments of the disclosure.

With reference to FIG. 13, a system consistent with an embodiment of the disclosure may include a computing device or cloud service, such as computing device 1300. In a basic configuration, computing device 1300 may include at least one processing unit 1302 and a system memory 1304. Depending on the configuration and type of computing device, system memory 1304 may comprise, but is not limited to, volatile (e.g. random access memory (RAM)), non-volatile (e.g. read-only memory (ROM)), flash memory, or any combination. System memory 1304 may include operating system 1305, one or more programming modules 1306, and may include a program data 1307. Operating system 1305, for example, may be suitable for controlling computing device 1300's operation. Furthermore, embodiments of the disclosure may be practiced in conjunction with a graphics library, other operating systems, or any other application program and is not limited to any particular application or system. This basic configuration is illustrated in FIG. 13 by those components within a dashed line 1308.

Computing device 1300 may have additional features or functionality. For example, computing device 1300 may also include additional data storage devices (removable and/or non-removable) such as, for example, magnetic disks, optical disks, or tape. Such additional storage is illustrated in FIG. 13 by a removable storage 1309 and a non-removable storage 1310. Computer storage media may include volatile and nonvolatile, removable and non-removable media implemented in any method or technology for storage of information, such as computer-readable instructions, data structures, program modules, or other data. System memory 1304, removable storage 1309, and non-removable storage 1310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 1300. Any such computer storage media may be part of device 1300. Computing device 1300 may also have input device(s) 1312 such as a keyboard, a mouse, a pen, a sound input device, a touch input device, etc. Output device(s) 1314 such as a display, speakers, a printer, etc. may also be included. The aforementioned devices are examples and others may be used.

Computing device 1300 may also contain a communication connection 1316 that may allow device 1300 to communicate with other computing devices 1318, such as over a network in a distributed computing environment, for example, an intranet or the Internet. Communication connection 1316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1304, including operating system 1305. While executing on processing unit 1302, programming modules 1306 (e.g., application 1320) may perform processes including, for example, one or more stages of method 300-500, algorithms, systems, applications, servers, databases as described above. The aforementioned process is an example, and processing unit 1302 may perform other processes. Other programming modules that may be used in accordance with embodiments of the present disclosure may include sound encoding/decoding applications, machine learning application, acoustic classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

What is claimed is:

1. A method of facilitating management of parking spaces for vehicles, the method comprising:
transmitting, using a communication device, a plurality of parking status indicators associated with a plurality of parking spaces to a user device associated with a vehicle, wherein the plurality of parking spaces are associated with a facility;
receiving, using the communication device, a parking reservation request from the user device;
transmitting, using the communication device, a reservation confirmation to the user device;
receiving, using the communication device, motion data from the user device, wherein the motion data is generated using a motion sensor;
determining, using a processing device, when the vehicle moves into a parking space among the plurality of parking spaces based on the motion data;
generating, using the processing device, an updated plurality of parking status indicators by updating a parking status indicator associated with the parking space;
storing, using a storage device, the updated plurality of parking status indicators;
receiving, using the communication device, a food service request from the user device; transmitting, using the communication device, food service information to the user device, wherein the food service information is associated with at least one food service provided by the facility; generating, using the processing device, at least one food query associated with the at least one food service; receiving, using the communication device, the at least one food query from the user device; analyzing, using the processing device, the at least one food query via natural language processing, machine learning, and/or artificial intelligence analysis; generating, using the processing device, at least one response corresponding to the at least one food query; transmitting, using the communication device, the at least one response to the user device; and receiving, using the communication device, a food service order from the user device.

2. The method of claim 1 further comprising:
storing, using the storage device, the service order.

3. The method of claim 1 further comprising:
identifying, using the processing device, a current location of the user device;

identifying, using the processing device, the facility based on the current location and the service request;

retrieving, using the storage device, the service information associated with the facility; and transmitting, using the communication device, the service information to the user device.

4. The method of claim 1 further comprising:

receiving, using the communication device, a vehicle type indicator from the user device; and identifying, using the processing device, at least one parking space of the plurality of parking spaces based on the vehicle type indicator.

5. The method of claim 1 further comprising receiving, using the communication device, a current location of the user device, wherein the generating of the plurality of parking status indicators is further based on the current location.

6. The method of claim 1 further comprising:

receiving, using the communication device, a current location of the user device; and determining, using the processing device, the current location being within a predetermined distance from a facility location associated with the facility, wherein the transmitting of the plurality of parking status indicators is based on the determining.

7. The method of claim 1 further comprising receiving, using a communication device, a parking request from a user device associated with the vehicle, wherein the transmitting of the plurality of parking status indicators is based on the parking request.

8. The method of claim 1, wherein the plurality of parking status indicators comprises a plurality of colors.

9. The method of claim 1, wherein the plurality of parking status indicators comprises a plan view corresponding to the facility, wherein the plan view depicts the plurality of parking spaces in association with the plurality of parking status indicators.

10. A system for facilitating management of parking spaces for vehicles, the system comprising:

a communication device;

a processing device;

a storage device;

the system being configured for:

transmitting, using the communication device, a plurality of parking status indicators associated with a plurality of parking spaces to a user device associated with a vehicle, wherein the plurality of parking spaces are associated with a facility;

receiving, using the communication device, a parking reservation request from the user device;

transmitting, using the communication device, a reservation confirmation to the user device;

receiving, using the communication device, motion data from the user device, wherein the motion data is generated using a motion sensor;

determining, using the processing device, when the vehicle moves into a parking space among the plurality of parking spaces based on the motion data;

generating, using the processing device, an updated plurality of parking status indicators by updating a parking status indicator associated with the parking space;

storing, using the storage device, the updated plurality of parking status indicators;

receiving, using the communication device, a food service request from the user device; transmitting, using the communication device, food service information to the user device, wherein the food service information is associated with at least one food service provided by the facility; generating, using the processing device, at least one food query associated with the at least one food service; receiving, using the communication device, the at least one food query from the user device; analyzing, using the processing device, the at least one food query via natural language processing, machine learning, and/or artificial intelligence analysis; generating, using the processing device, at least one response corresponding to the at least one food query; transmitting, using the communication device, the at least one response to the user device; and receiving, using the communication device, a food service order from the user device.

11. The system of claim 10, wherein the storage device is further configured for storing the service order.

12. The system of claim 10 wherein the communication device is further configured for transmitting the service information to the user device;

wherein the processing device is further configured for identifying a current location of the user device;

wherein the processing device is further configured for identifying the facility based on the current location and the service request; and wherein the storage device is further configured for retrieving the service information associated with the facility.

13. The system of claim 10, wherein the communication device is further configured for receiving a vehicle type indicator from the user device, wherein the processing device is configured for identifying at least one parking space of the plurality of parking spaces based on the vehicle type indicator.

14. The system of claim 10, wherein the communication device is further configured for receiving a current location of the user device, wherein the generating of the plurality of parking status indicators is further based on the current location.

15. The system of claim 10, wherein the communication device is further configured for receiving a current location of the user device, wherein the processing device is further configured for determining the current location being within a predetermined distance from a facility location associated with the facility, wherein the transmitting of the plurality of parking status indicators is based on the determining.

16. The system of claim 10, wherein the communication device is further configured for receiving a parking request from a user device associated with the vehicle, wherein the transmitting of the plurality of parking status indicators is based on the parking request.

17. The system of claim 10, wherein the plurality of parking status indicators comprises a plurality of colors.

18. The system of claim 10, wherein the plurality of parking status indicators comprises a plan view corresponding to the facility, wherein the plan view depicts the plurality of parking spaces in association with the plurality of parking status indicators.

* * * * *